(12) United States Patent
Champ

(10) Patent No.: US 8,408,648 B2
(45) Date of Patent: Apr. 2, 2013

(54) FOLD AND TUMBLE RELEASE MECHANISM FOR A VEHICLE SEAT

(75) Inventor: William D. Champ, Mount Clemens, MI (US)

(73) Assignee: Lear Corporation, Southfield, MI (US)

( * ) Notice: Subject to any disclaimer, the term of this patent is extended or adjusted under 35 U.S.C. 154(b) by 517 days.

(21) Appl. No.: 12/724,494

(22) Filed: Mar. 16, 2010

(65) Prior Publication Data

US 2011/0049953 A1 Mar. 3, 2011

Related U.S. Application Data

(63) Continuation-in-part of application No. 12/549,169, filed on Aug. 27, 2009, now abandoned.

(51) Int. Cl.
*B60N 2/02* (2006.01)

(52) U.S. Cl. .................. 297/335; 297/336; 297/378.13; 296/65.01; 296/65.16

(58) Field of Classification Search .............. 297/378.1, 297/378.13, 325, 335, 336; 296/65.01, 65.09, 296/65.16
See application file for complete search history.

(56) References Cited

U.S. PATENT DOCUMENTS

| | | | |
|---|---|---|---|
| 5,393,116 A * | 2/1995 | Bolsworth et al. | 296/65.03 |
| 5,622,410 A | 4/1997 | Robinson | |
| 5,749,625 A | 5/1998 | Robinson | |
| 6,158,800 A | 12/2000 | Tsuge et al. | |
| 6,523,899 B1 | 2/2003 | Tame | |
| 6,698,837 B2 | 3/2004 | Pejathaya et al. | |
| 6,749,263 B2 | 6/2004 | Peters | |
| 6,793,285 B1 * | 9/2004 | Tame | 297/336 |
| 6,857,703 B2 | 2/2005 | Bonk | |
| 6,860,562 B2 | 3/2005 | Bonk | |
| 6,910,739 B2 | 6/2005 | Grable et al. | |
| 6,932,409 B2 | 8/2005 | Falchero et al. | |
| 7,152,900 B2 | 12/2006 | Trombley et al. | |
| 7,198,316 B2 | 4/2007 | Lutzka et al. | |
| 7,309,095 B2 | 12/2007 | O'Connor | |
| 7,364,237 B2 | 4/2008 | Grable et al. | |
| 7,393,056 B2 | 7/2008 | O'Connor | |
| 7,434,862 B2 | 10/2008 | Lutzka et al. | |

(Continued)

FOREIGN PATENT DOCUMENTS

| | | |
|---|---|---|
| DE | 102 97 476 T5 | 11/2004 |
| DE | 103 93 647 B4 | 12/2008 |

(Continued)

OTHER PUBLICATIONS

German Office Action dated Jan. 13, 2011, Applicant: Lear Corporation, Application No. 10 2010 031 278.9-16, 4 Pages.

*Primary Examiner* — Sarah B McPartlin
(74) *Attorney, Agent, or Firm* — Brooks Kushman P.C.

(57) ABSTRACT

A fold and tumble mechanism may be used with a vehicle seat having a seat bottom, a seat back that is pivotable with respect to the seat bottom, and a latch associated the seat bottom for coupling the seat to a vehicle body. The fold and tumble mechanism may include a recliner mechanism adapted to pivotally mount the seat back to the seat bottom, a recliner release lever, and a fold and tumble release lever. The recliner release lever is associated with the recliner mechanism and is movable to selectively release the recliner mechanism to allow the seat back to pivot. The fold and tumble release lever includes a cam that is engageable with the recliner release lever. Furthermore, the fold and tumble release lever is operable to move the recliner release lever to release the recliner mechanism, and is further operable to unlatch the latch.

20 Claims, 10 Drawing Sheets

U.S. PATENT DOCUMENTS

| | | |
|---|---|---|
| 7,513,573 B2 | 4/2009 | Wahls et al. |
| 7,513,575 B1 | 4/2009 | Go |
| 7,896,441 B2 * | 3/2011 | Krahn-Lau et al. ...... 297/378.12 |
| 2007/0062324 A1 | 3/2007 | Ingraham |
| 2008/0073961 A1 | 3/2008 | Wahls et al. |
| 2008/0073962 A1 | 3/2008 | Wahls et al. |
| 2009/0140565 A1 | 6/2009 | Wahls et al. |

FOREIGN PATENT DOCUMENTS

| | | |
|---|---|---|
| GB | 2 425 945 A | 11/2006 |

* cited by examiner

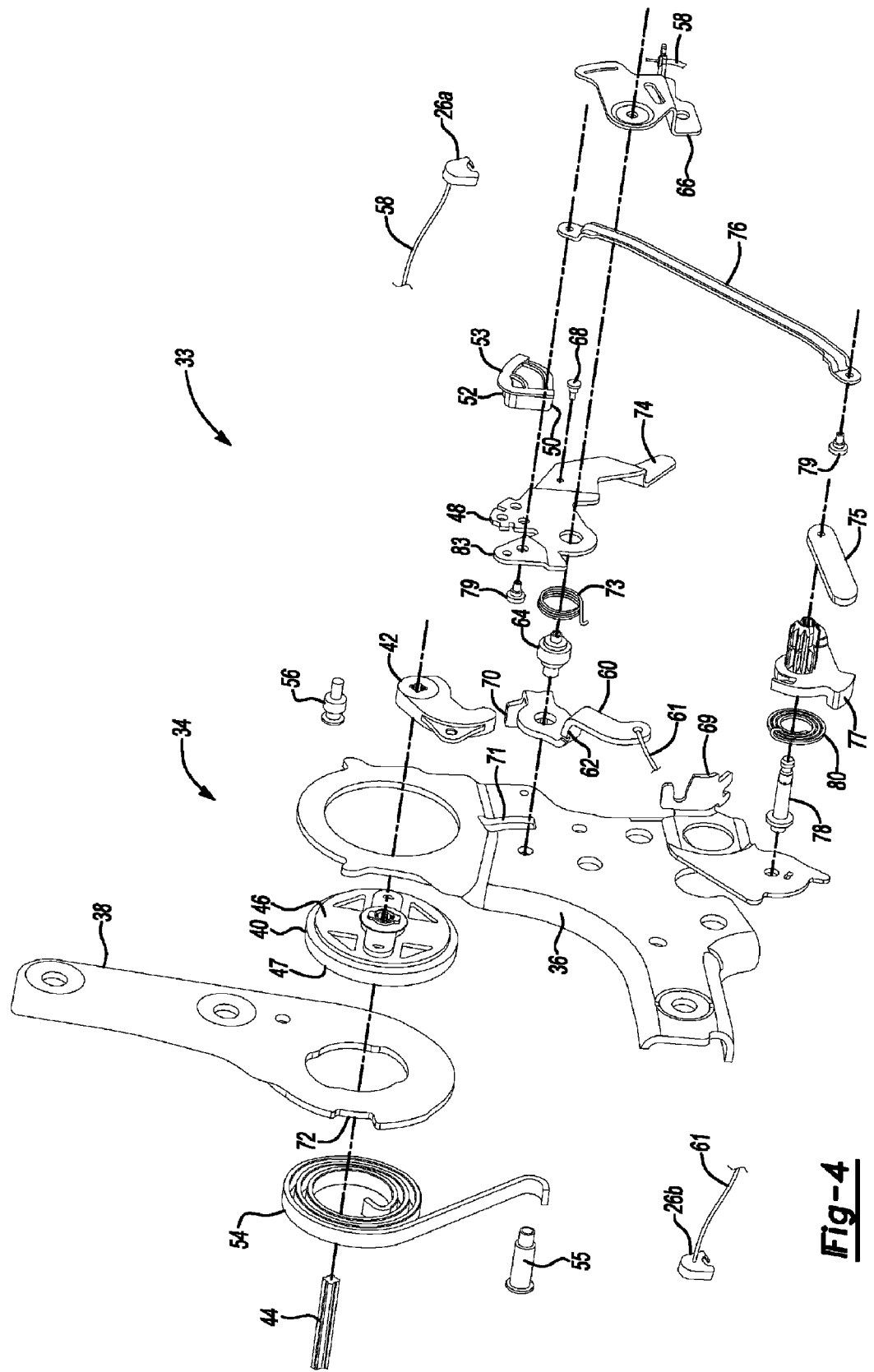

FOLD AND TUMBLE RELEASE MECHANISM FOR A VEHICLE SEAT

CROSS-REFERENCE TO RELATED APPLICATIONS

This application is a continuation-in-part of U.S. application Ser. No. 12/549,169 filed Aug. 27, 2009, which is hereby incorporated in its entirety by reference.

TECHNICAL FIELD

The invention relates to fold and tumble mechanisms for vehicle seating assemblies.

BACKGROUND

Vehicle seat assemblies may be configured to move between use positions and collapsed or stowed positions. U.S. Pat. Nos. 6,932,409 and 7,152,900 disclose examples of such seat assemblies.

SUMMARY

A fold and tumble mechanism according to an embodiment of the present disclosure may be used with a vehicle seat having a seat bottom, a seat back that is pivotable with respect to the seat bottom, and a latch associated the seat bottom for coupling the seat to a vehicle body. The fold and tumble mechanism may include a seat back recliner mechanism adapted to pivotally mount the seat back to the seat bottom, a recliner release lever, and a fold and tumble release lever. The recliner release lever is associated with the seat back recliner mechanism and is movable to selectively release the seat back recliner mechanism to allow the seat back to pivot. The fold and tumble release lever includes a cam that is engageable with the recliner release lever. Furthermore, the fold and tumble release lever is operable to move the recliner release lever to release the recliner mechanism, and is further operable to unlatch the latch.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 4 is an exploded perspective view of the fold and tumble mechanism of FIGS. 1-3;

DETAILED DESCRIPTION

The present disclosure describes various vehicle seat assemblies including fold and tumble mechanisms. Several specific embodiments are set forth in the following description and in FIGS. 1-15 to provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

Figure 1:
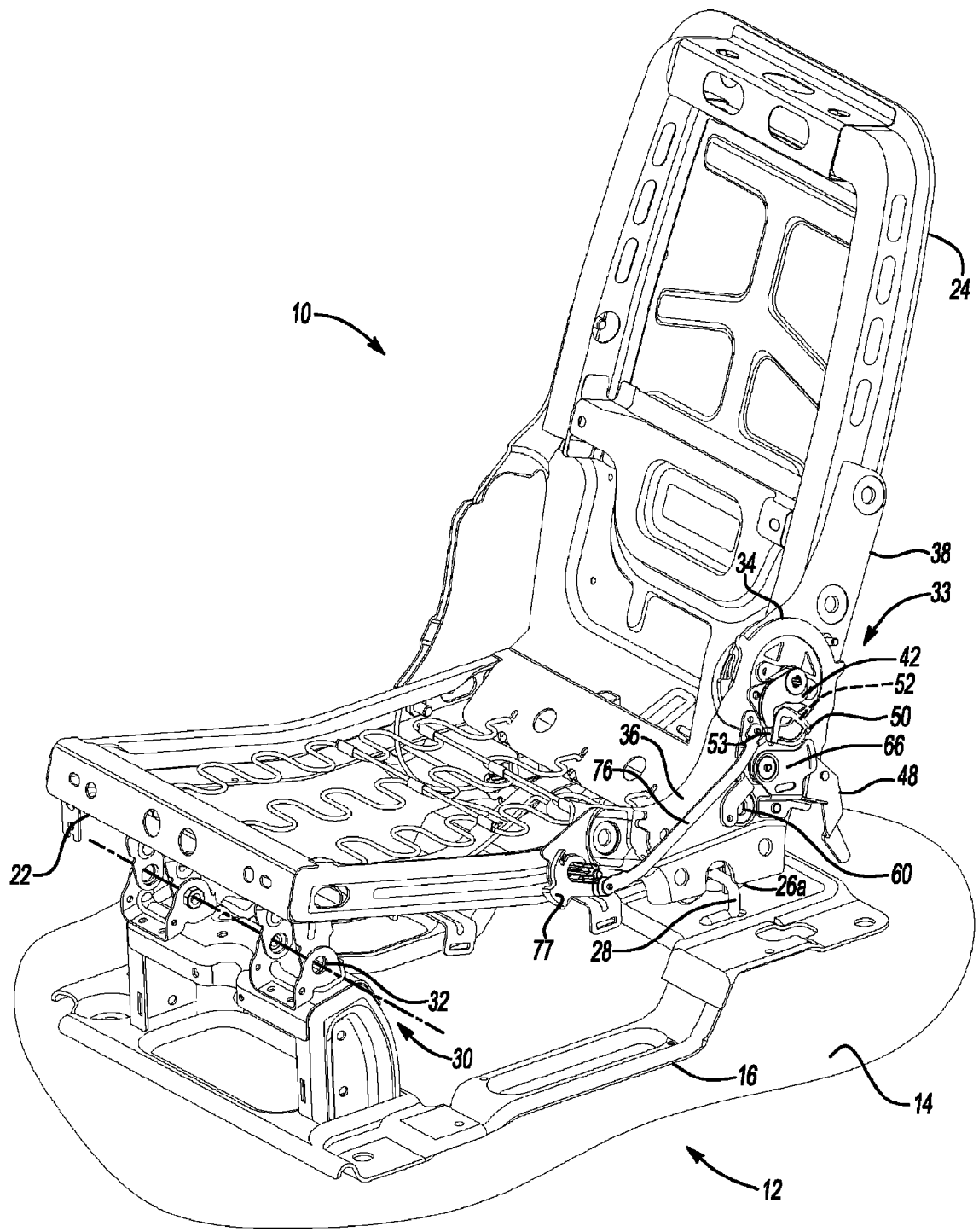
FIG. 1 is a perspective view of a vehicle seat assembly having a fold and tumble mechanism according to one embodiment of the present disclosure.

FIG. 1 shows a vehicle seat assembly 10 in accordance with the present disclosure, which may be coupled to a vehicle body 12 in any suitable manner. For example, the seat assembly 10 may be attached directly or indirectly to a floor 14 of the vehicle body 12. In the embodiment shown in FIG. 1, the seat assembly 10 is pivotally attached to a support structure 16 that is mounted on the floor 14.

The seat assembly 10 includes a generally horizontal seat bottom 22 and a generally vertical seat back 24 that is pivotable with respect to the seat bottom 22. The seat bottom 22 and seat back 24 may each include any suitable cushioning material (not shown), such as a foam cushion, and any suitable cover material (not shown), such as cloth, leather and/or vinyl.

The seat assembly 10 may also include one or more latches 26, such as floor latches, that are configured to releasably couple the seat assembly 10 to the vehicle body 12. In the embodiment shown in FIGS. 1-3, the seat assembly 10 is provided with outboard and inboard floor latches 26a and 26b, respectively (only the outboard floor latch 26a is visible in FIG. 1) that are coupled with the seat bottom 22 and that are each engageable with an engaging member, such as a striker 28, that is attached to the floor 14 of the vehicle body 12. When the latches 26a,b are released or unlatched from the vehicle body 12, the seat bottom 22 and seat back 24 may pivot relative to the support structure 16 about a pivot axis 30, which may extend through a tumble pivot mount 32 of the support structure 16, for example.

As another example, the seat assembly 10 may be provided with one or more latches that are each engageable with a side portion of the vehicle body 12.

Referring to FIGS. 1-4, the vehicle seat assembly 10 also includes a fold and tumble mechanism or apparatus 33 having a seat back recliner mechanism 34 connected to the seat bottom 22 and seat back 24. For example, the recliner mechanism 34 may include a first bracket 36, such as a lower bracket, connected to a seat bottom frame of the seat bottom 22, and a second bracket 38, such as an upper bracket, connected to a seat back frame of the seat back 24. The recliner mechanism 34 further includes a recliner device 40 connected to the brackets 36 and 38 in any suitable manner, such as by welding. The recliner device 40 is configured to selectively lock the second bracket 38 and seat back 24 in one or more use or seating positions, and is further configured to enable the second bracket 38 and seat back 24 to pivot with respect to the first bracket 36 and seat bottom 22, as explained below in detail. While the recliner mechanism 34 may be any suitable mechanism, in one embodiment, the recliner mechanism 34 is a disk recliner mechanism including a disk recliner device.

Figure 6:
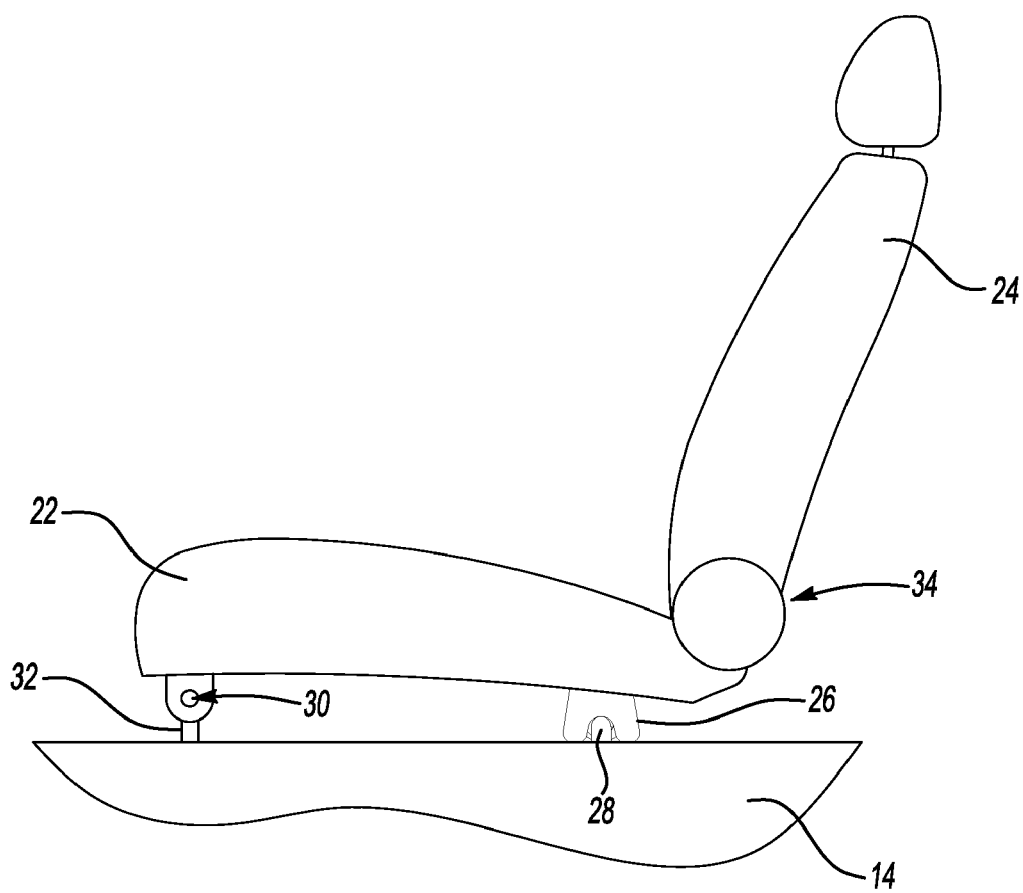
FIG. 6 is a side view of the vehicle seat assembly of FIG. 1 in a seating position.
Figure 7:
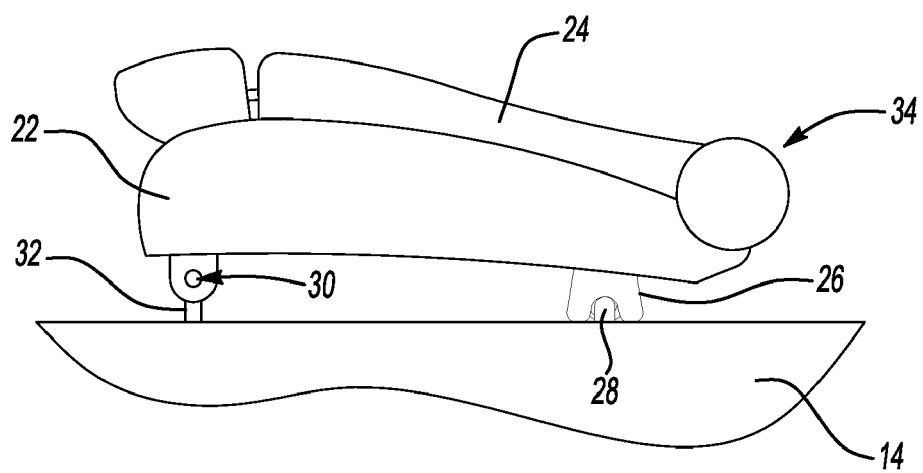
FIG. 7 is a side view of the vehicle seat assembly of FIG. 1 in a folded position.

The recliner mechanism 34 has a locked state, in which the seat back 24 is inhibited from pivoting relative to the seat bottom 22, and an unlocked or released state, in which the seat back 24 may be pivoted relative to the seat bottom 22 between one or more use positions and a folded position. For example, FIG. 6 shows the seat back 24 locked in a substantially upright use position, and FIG. 7 shows the seat back 24 in a folded position in which the seat back 24 is generally horizontally disposed relative to the floor 14.

Returning to FIGS. 1-4, the fold and tumble apparatus 33 may also include a movable recliner release lever 42 associated with the seat back recliner mechanism 34 for releasing the recliner mechanism 34. In the illustrated embodiment, the recliner release lever 42 is connected to the recliner mechanism 34 with a spline-keyed shaft 44, and is rotatable clockwise to place the recliner mechanism 34 in the unlocked state. For example, if the recliner mechanism 34 is a disk recliner mechanism, the recliner release lever 42 may rotate about a central axis of the recliner mechanism 34 to release the recliner mechanism 34 and thereby allow one disk or plate of the recliner device 40 to pivot with respect to another disk or plate. More specifically, the recliner device 40 of the recliner mechanism 34 may include a guide plate 46 connected to the first bracket 36, a pivot plate 47 pivotally connected to the guide plate 46 and fixedly connected to the second bracket 38, and one or more locking elements (not shown) that are movably guided by the guide plate 46 between a locked position, in which the locking elements are engaged with internal gear teeth (not shown) on the pivot plate 47, and a disengaged position, in which the locking elements are disengaged from the gear teeth of the pivot plate 47. The locking elements may each have a cam engagement surface (not shown) that is engageable with an internal cam (not shown) of the recliner device 40. The internal cam may be connected to the recliner release lever 42 such that rotation of the recliner release lever 42 causes the internal cam to rotate, which causes the locking elements to move between the locked position and the disengaged position. Additional details of a disk recliner mechanism may be found in U.S. Patent Application Publication 2009/0140565, which is hereby incorporated in its entirety by reference.

As another example, the recliner mechanism 34 may be a pawl-and-sector type recliner mechanism including a generally circular sector gear (not shown) having engagement teeth (not shown), and a movable pawl (not shown) having teeth (not shown) configured to engage the sector gear. When the teeth on the pawl and the engagement teeth on the sector gear are engaged, the recliner mechanism may be in a locked position such that the seat back 24 is prevented from pivoting with respect to the seat bottom 22. As the recliner release lever 42 is moved, the recliner release lever 42 may act on the pawl to pivot the pawl through a disengagement angle and disengage the pawl from the sector gear, thereby placing the recliner mechanism in an unlocked state. Additional details of a pawl-and-sector recliner mechanism may be found in U.S. Pat. No. 5,749,625 to Robinson, which is hereby incorporated in its entirety by reference.

The fold and tumble apparatus 33 may also include a fold and tumble release lever 48 that is movable between first and second positions for allowing a user to release the recliner mechanism 34 and unlatch the latches 26a,b. The fold and tumble release lever 48 includes a cam 50 that is engageable with the recliner release lever 42 to move the recliner release lever 42 as the fold and tumble release lever 48 is moved. As a result, the fold and tumble release lever 48 may be moved from the first position to an intermediate position located between the first and second positions to cause the recliner release lever 42 to release the recliner mechanism 34. The fold and tumble release lever 48 may be further moved from the intermediate position to the second position to cause the latches 26a,b to unlatch from the vehicle body 12 to allow the seat assembly 10 to be tumbled or stowed, as explained below in detail. According to one embodiment, the fold and tumble release lever 48 may have a limited travel path for unlocking the recliner mechanism 34 and releasing the latches 26a,b.

In one embodiment, the cam 50 may be snap fit onto a body of the fold and tumble release lever 48. Alternatively, the cam 50 may be connected to the body of the fold and tumble release lever 48 in any suitable manner, or the cam 50 may be integrally formed with the fold and tumble release lever body.

In the illustrated embodiment, the cam 50 includes a dwell surface 52 that is configured to slidingly contact the recliner release lever 42 as the fold and tumble release lever 48 is moved from the intermediate position to the second position. With such a configuration, the fold and tumble release lever 48 may continue to be moved after the recliner mechanism 34 has been released.

In at least one embodiment, the cam 50 includes a flange or lip 53. As illustrated in FIG. 4, the lip 53 may extend from a main body of the cam 50 and is configured to engage the recliner release lever 42 along a side of the recliner release lever 42 to prevent the recliner release lever 42 from axial movement away from the recliner mechanism 34.

Figure 2:
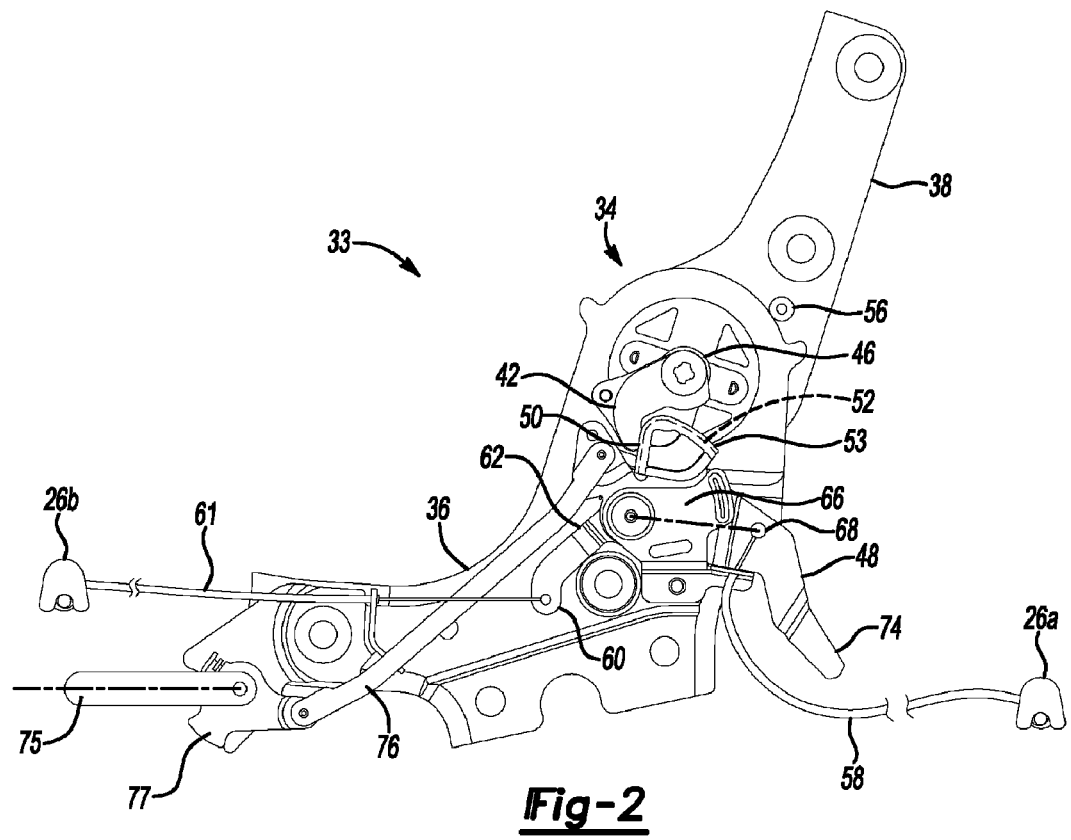
FIG. 2 is a side view of the fold and tumble mechanism of FIG. 1 in a use position.
Figure 3A:
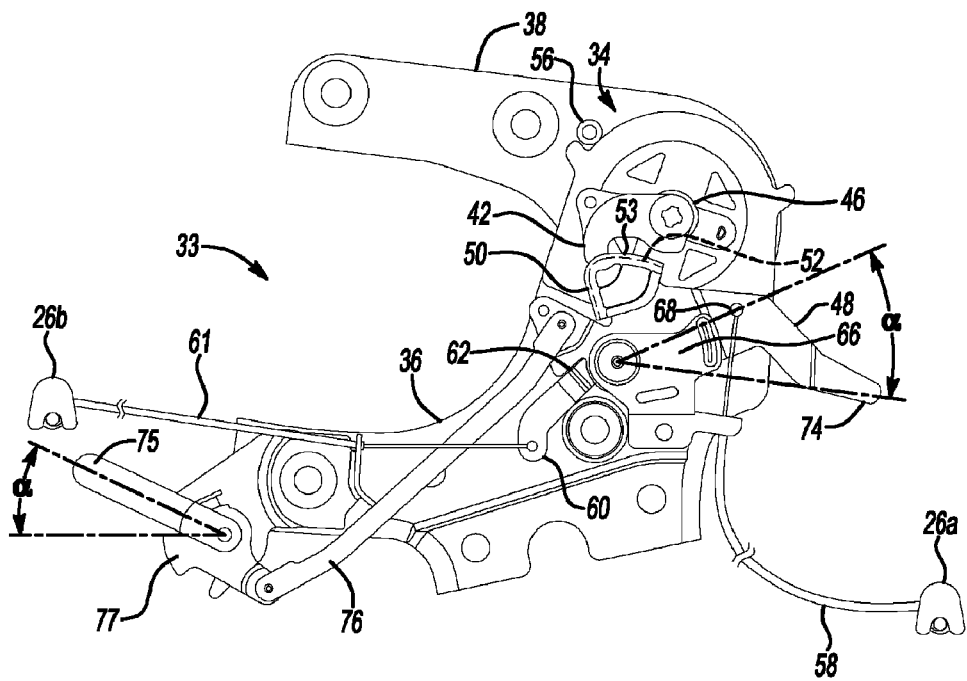
FIG. 3A is a side view of the fold and tumble mechanism of FIG. 2 in a folded position.
Figure 5:
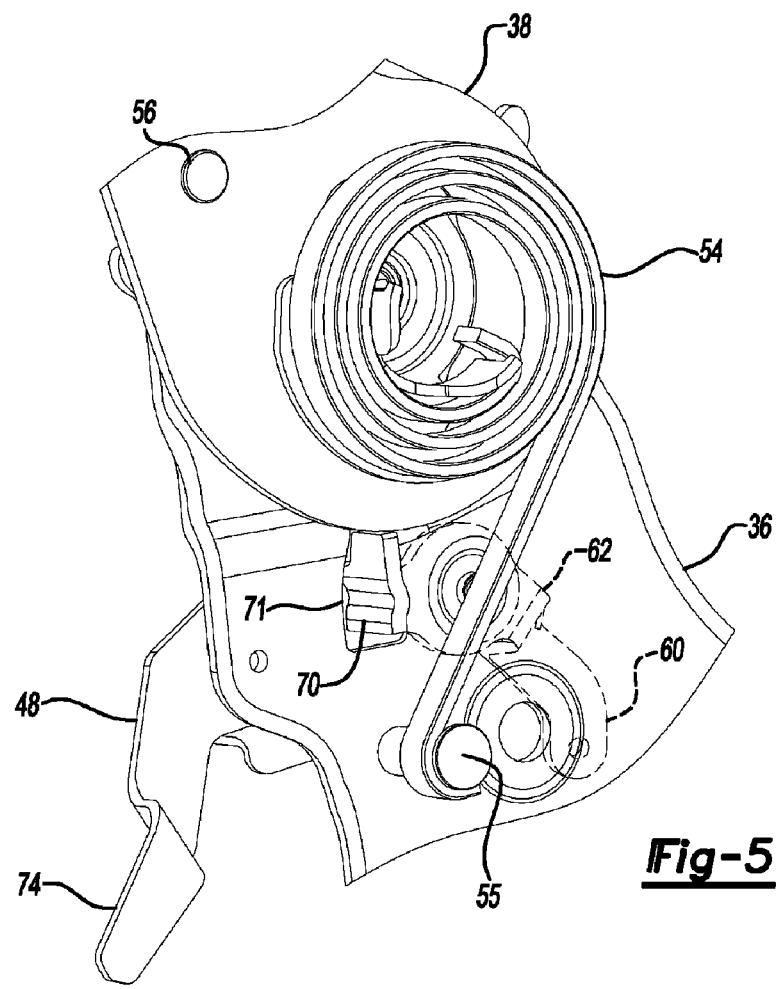
FIG. 5 is an enlarged perspective view of an inboard portion of the fold and tumble mechanism of FIGS. 1-3.

As a more detailed example, referring to FIGS. 2 and 3A, the fold and tumble release lever 48 may be pivoted through a first angle $\alpha$ to move the recliner release lever 42 to a release position and release the recliner mechanism 34. As the recliner release mechanism is released, the seat back 24 may pivot automatically to a folded position (best shown in FIG. 7). Referring to FIGS. 4 and 5, a clock spring 54 may be connected to the second bracket 38 and an anchor pin 55 on the first bracket 36 to bias the seat back 24 forwardly to automatically pivot the seat back 24 to the folded position shown in FIG. 7. The second bracket 38 may also include a stop, such as a back stop rivet 56, configured to engage the first bracket 36 when the second bracket 38 is in the folded position to prevent the second bracket 38 from further pivoting.

Figure 3B:
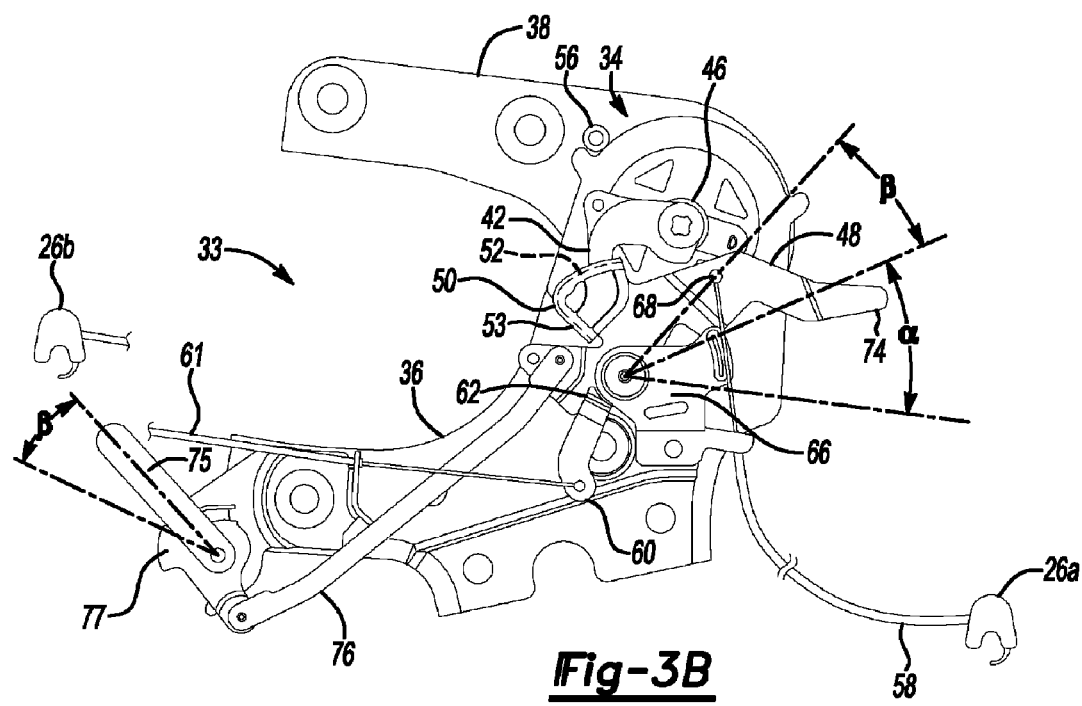
FIG. 3B is a side view of the fold and tumble mechanism of FIG. 2 in a folded position and unlatched from the vehicle body.

Referring to FIG. 3B, as the fold and tumble release lever 48 is further pivoted through a second angle $\beta$, the fold and tumble release lever 48 may cause the latches 26a,b to unlatch while the recliner release lever 42 engages the dwell surface 52 of the cam 50. The seat assembly 10 may then automatically pivot forward about the pivot axis 30 to the tumbled position, illustrated in FIG. 8, by means of one or more springs 57 and/or gas-charged struts (not shown) acting on the seat bottom 22, for example.

Referring to FIG. 2, the fold and tumble release lever 48 may be connected to the outboard latch 26a with a cable or cable assembly 58, such as a Bowden cable, such that movement of the fold and tumble release lever 48 causes the outboard latch 26a to unlock or unlatch. In addition, the fold and tumble apparatus 33 may include a latch release lever 60 that is associated with the inboard latch 26b for releasing or unlatching the inboard latch 26b. For example, the latch release lever 60 may be connected to the inboard latch 26b with a cable or cable assembly 61, such as a Bowden cable, such that movement of the latch release lever 60 causes the inboard latch 26b to unlock or unlatch.

The latch release lever 60 may also be associated with the fold and tumble release lever 48, such that movement of the fold and tumble release lever 48 may cause the latch release lever 60 to move. For example, with reference to FIG. 4, the latch release lever 60 may include a stop 62 that is engageable with the fold and tumble release lever 48, such that the levers 48 and 60 may move together after the fold and tumble release lever 48 has engaged the stop 62 to thereby unlatch both latches 26a,b. Furthermore, the latch release lever 60 may be pivotally connected to the fold and tumble release lever 48 and recliner mechanism 34 with a fastener, such as a cam pivot rivet 64. The latch release lever 60 and fold and tumble release lever 48 may be coaxially aligned with and pivot about cam pivot rivet 64. As another example, the release lever 60 may be connected to the fold and tumble release lever 48 in any suitable manner.

Still referring to FIG. 4, the fold and tumble apparatus 33 may also include a cable mount bracket 66 that is fixedly connected to the first bracket 36 by one or more fasteners, such as the anchor pin 55 and the cam pivot rivet 64. The cable mount bracket 66 may retain an outer casing that surrounds an inner cable of the cable assembly 58, and the inner cable may be connected to the fold and tumble release lever 48 with a fastener, such as a nail head rivet 68. With such a configuration, the inner cable may travel relative to the outer casing as the fold and tumble release lever 48 moves, thereby exerting a force on the outboard latch 26a that causes the outboard latch 26a to unlatch.

Similarly, the fold and tumble apparatus 33 may also include an additional cable mount bracket, such as side bracket 69, that is integrally formed with the first bracket 36 or fixedly connected to the first bracket 36 with one or more fasteners. The side bracket 69 may retain an outer casing that surrounds an inner cable of the cable assembly 61, and the inner cable may be connected to the latch release lever 60. With such a configuration, the inner cable may travel relative to the outer casing as the latch release lever 60 moves, thereby exerting a force on the inboard latch 26b that causes the inboard latch 26b to unlatch.

In the embodiment shown in FIGS. 4 and 5, the latch release lever 60 also includes a tab, such as a flange 70, that extends through an opening 71 in the first bracket 36 and engages the second bracket 38 when the seat back 24 is in one of the use positions, such that movement of the latch release lever 60 is inhibited. As a result, the latch release lever 60 and fold and tumble release lever 48 are prevented from rotating sufficiently to unlatch the latches 26a,b from the vehicle body 12 when the seat back 24 and second bracket 38 are in one of the use positions.

The second bracket 38 may include a notch 72 that is alignable with the flange 70 of the latch release lever 60 when the seat back 24 and second bracket 38 are in the folded position, such that the latch release lever 60 may be permitted to sufficiently travel to an unlatched position to unlatch the inboard latch 26b from the vehicle body 12. More specifically, when the seat back 24 and second bracket 38 are in the folded position shown in FIG. 3A, the notch 72 on the second bracket 38 is aligned with the opening 71 of the first bracket 36, such that the flange 70 may move upward along the opening 71 and into the notch 72 as the latch release lever 60 is rotated forwardly.

The fold and tumble apparatus 33 may also include a biasing member, such as a spring 73, that urges the flange 70 toward the unlatched position. In the embodiment shown in FIG. 4, the spring 73 is a torsion spring having one end engaged with the fold and tumble release lever 48 and another end engaged with the latch release lever 60 to cause the two levers to be biased in rotationally opposite directions. However, any suitable spring or other biasing member may be used.

By action of the spring 73, disengagement of the flange 70 from the notch 72 may be prevented when the seat assembly 10 is not latched to the vehicle body 12. This prevents pivoting of the seat back 24 from the folded position to one of the seating or use positions when the latches 26a,b are unlatched from the vehicle body 12.

In the embodiment illustrated, the latch release lever 60 is connected to the inboard latch 26b by the cable assembly 61, and the inner cable of the cable assembly 61 travels during relatching of the inboard latch 26b and with respect to the outer casing that surrounds the inner cable, thereby pulling the latch release lever 60 against the bias of the spring 73. More specifically, when the inboard latch 26b is relatched to the vehicle body 12, the flange 70 of the latch release lever 60 is pulled away from the notch 72 in opposition to the urging of the spring 73. As a result, the flange 70 is automatically disengaged from the notch 72 when the inboard latch 26b is relatched to the vehicle body 12, such that the second bracket 38 is permitted to pivot out of the folded position.

The fold and tumble apparatus 33 may also include a handle 74 for allowing a user to rotate the fold and tumble release lever 48 manually. In the exemplary embodiment illustrated, the fold and tumble release lever 48 and the handle 74 are integrally formed. However, any suitable means for securing or otherwise associating the fold and tumble release lever 48 with the handle 74 are contemplated for use with the present disclosure. Furthermore, rotation of the handle 74 through an angle may also cause rotation of the fold and tumble release lever 48 through the same angle.

With reference again to FIGS. 2-4, the fold and tumble apparatus 33 may further include an additional handle, such as a side handle 75, connected to or otherwise associated with the fold and tumble release lever 48. In the illustrated embodiment, for example, the side handle 75 is pivotally mounted on the seat bottom 22 and is connected to the fold and tumble release lever 48 by a handle linkage 76. The handle linkage 76 may allow the side handle 75 to drive the fold and tumble release lever 48 and handle 74, such that rotation of the side handle 75 through an angle also causes rotation of the fold and tumble release lever 48 through the same or a different angle. An occupant or user may thus rotate the more convenient of the handle 74 and side handle 75 to begin a fold and tumble operation.

According to one embodiment, the side handle 75 and the handle linkage 76 may be connected to a rotatable member, such as a spindle 77, which may be connected to the seat bottom 22. As illustrated in FIG. 4, for example, the spindle 77 may be connected to the first bracket 36, or other component connected to the first bracket 36 such as side bracket 69, by a fastener, such as a spindle pivot pin 78, that allows the spindle 77 to pivot relative to the first bracket 36. The handle linkage 76 may be connected to the side handle 75 and/or the spindle 77 by a fastener, such as a link rivet 79. The handle linkage 76 may also be connected to the fold and tumble release lever 48 by, for example, another link rivet 79.

The spindle 77 and side handle 75 may be configured to return to their original positions after the side handle 75 is pivoted and released. For example, as illustrated in FIG. 4, the spindle 77 may be biased by a biasing member, such as a spindle spring 80, that is connected between the side bracket 69 and the spindle 77. The side handle 75 and spindle 77 may be rotated against the bias of the spindle spring 80, as shown in FIGS. 3A and 3B. When the side handle 75 is released, the spindle spring 80 causes the side handle 75 and the spindle 77 to return to their initial or original positions shown in FIG. 2.

The fold and tumble apparatus 33 may also be configured to be actuated automatically. In the embodiment shown in FIG. 9, for example, the fold and tumble apparatus 33 includes an electric motor 81 that may be connected to the seat bottom 22 is configured to automatically move the fold and tumble release lever 48. While the electric motor 81 may be connected to the fold and tumble release lever 48 in any suitable manner, in the embodiment illustrated, the electric motor 81 is connected to the fold and tumble release lever 48 with a cable or cable assembly 82, such as a Bowden cable that includes an inner cable attached at an attachment location, such as eyelet 83, of the fold and tumble release lever 48. The electric motor 81 pulls the inner cable of the cable assembly 82 to move the lever 48. According to at least one embodiment, the electric motor 81 may be activated and controlled by means of one or more switches (not shown) that may be mounted on a side wall of the vehicle body 12, for example. As another example, the electric motor 81 may be activated and controlled by any suitable means.

The electric motor 81 may be used to automatically move the fold and tumble release lever 48 through the first angle α to cause the recliner mechanism 34 to unlatch and allow the seat back 24 to automatically pivot forward, as discussed above in detail. In addition, the electric motor 81 may automatically move the fold and tumble release lever 48 through the second angle β to unlatch the latches 26a,b and allow the seat assembly 10 to automatically pivot forward to the tumbled position.

Figure 8:
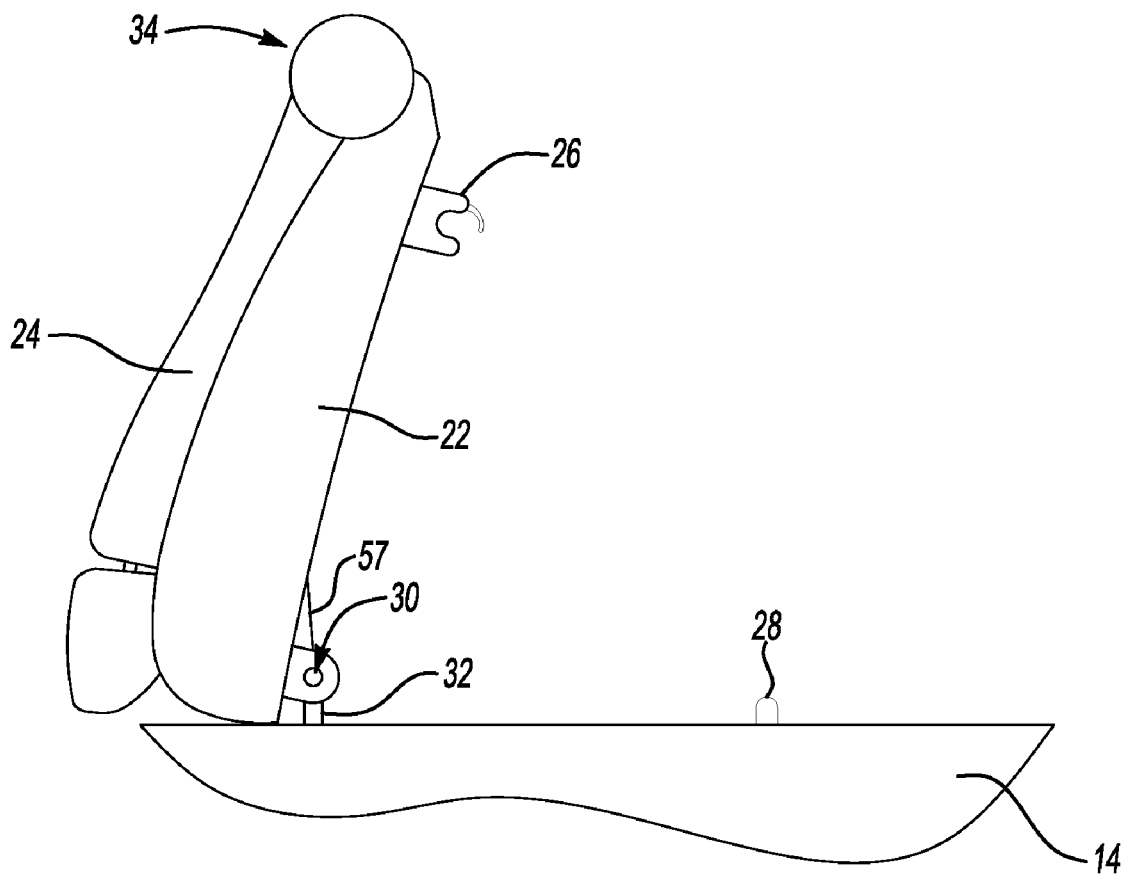
FIG. 8 is a side view of the vehicle seat assembly of FIG. 1 in a tumbled position.

Referring to FIGS. 2-8, operation of the seat assembly 10 will now be described in detail. When a user desires to move the seat assembly 10 from a use position, such as shown in FIG. 6, to a stowed or folded and tumbled position, such as shown in FIG. 8, a user may rotate either handle 74 or side handle 75 to cause rotation of the fold and tumble release lever 48. When the fold and tumble release lever 48 is moved through the first angle α, as shown in FIG. 3A, the cam 50 causes the recliner release lever 42 to move to the release position and release the recliner mechanism 34 so that the seat back 24 and second bracket 38 may pivot to the folded position shown in FIG. 7. While the first angle α may be any suitable angle, in one embodiment, the first angle α is in the range of twenty to forty degrees. For example, the first angle α may be thirty degrees.

When the fold and tumble release lever 48 is rotated through the first angle α, the latch release lever 60 may remain stationary. For example, the flange 70 on the release lever 60 may engage the second bracket 38, thereby preventing movement of the latch release lever 60. As a result, release of one or both of the latches 26a,b may be prevented when the seat back 24 and second bracket 38 are in one of the use positions. This may ensure that the vehicle seat assembly 10 is in the folded position before beginning the tumbling operation. Furthermore, the fold and tumble release lever 48 may engage the stop 62 on the latch release lever 60 at the end of travel through the first angle α, so that the levers 48 and 60 may move together beyond the first angle α.

Referring to FIGS. 3A-5 and 7, when the seat back 24 is in the folded position and the flange 70 of the latch release lever 60 is aligned with the notch 72 of the second bracket 38, the handle 74 or side handle 75 may be further rotated to cause the levers 48 and 60 to move together through the second angle β to cause the latches 26a,b to unlatch from the vehicle body 12. While the second angle β may be any suitable angle, in one embodiment, the second angle β is in the range of fifteen to forty degrees. For example, the second angle β may be twenty-five degrees.

Furthermore, as the fold and tumble release lever 48 is rotated through the second angle β, the dwell surface 52 of the cam 50 slidingly contacts the recliner release lever 42. The dwell surface 52 may be configured so that as the fold and tumble release lever 48 travels through the second angle β, the recliner release lever 42 remains actuated in the release position to keep the recliner mechanism 34 in the released state. The dwell surface 52 may therefore prevent the seat back 24 from being locked in one of the use or seating orientations when the fold and tumble release lever 48 is rotated beyond the first angle α and through the second angle β.

When the fold and tumble release lever 48 and the latch release lever 60 are rotated through the second angle β, the latch release lever 60 pulls on the inner cable of the cable assembly 61 and the fold and tumble release lever 48 pulls on the inner cable of the cable assembly 58, thereby causing the latches 26a,b to unlatch. As a result, the seat assembly 10 may be pivoted about the tumble pivot mount 32 to the tumbled position shown in FIG. 8.

The seat assembly 10 may then be returned to the use position by moving the seat assembly 10 back toward the floor 14 and reengaging the latches 26a,b with the vehicle body 12. As a result, the flange 70 of the latch release lever 60 will automatically disengage from the notch 72 in the second bracket 38, so that the seat back 24 may then be pivoted back to the use position shown in FIG. 6.

According to another embodiment, the latch release lever 60 may move with the fold and tumble release lever 48 at all times, such that the fold and tumble release lever 48 and the latch release lever 60 each move through the same or similar angles. With such a configuration, as the fold and tumble release lever 48 is moved through the first angle α and the second angle β, the latch release lever 60 may also move through the same angles. For example, the fold and tumble release lever 48 and latch release lever 60 may be integrally formed or fixedly connected together, with the fold and tumble release lever 48 configured to release the recliner mechanism 34 as described above in detail. The latch release lever 60 may also be connected to a cable or cable assembly, such as cable assembly 61, that is configured to exert an unlatching force on inboard latch 26b only after the fold and tumble release lever 48 and the latch release lever 60 have traveled beyond the first angle α.

Figure 9:
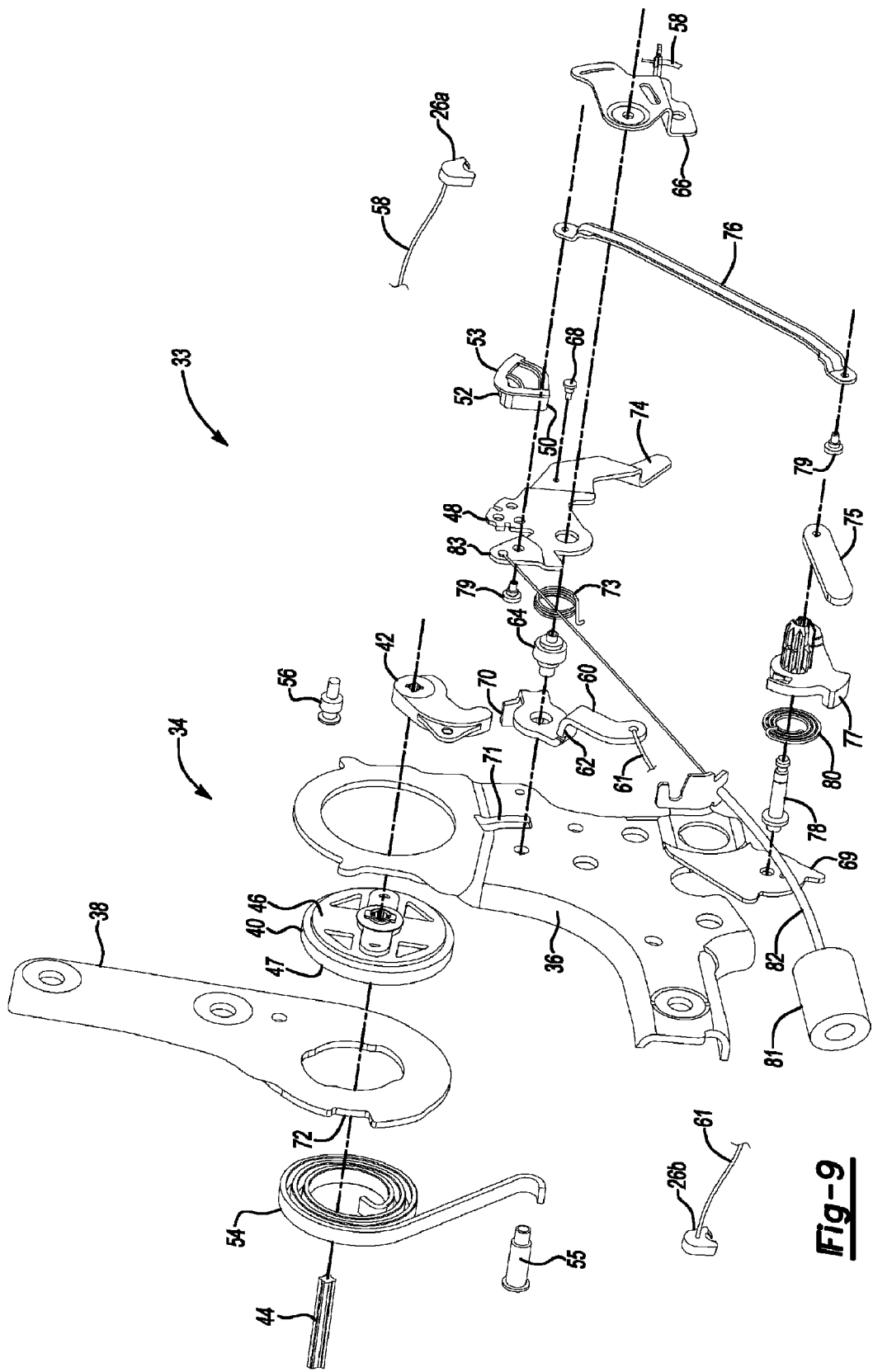
FIG. 9 is an exploded perspective view of a fold and tumble mechanism according to an alternate embodiment.

The embodiment illustrated in FIG. 9 may be operated in a similar manner as described above with respect to the embodiment of FIGS. 2-8. However, a user may begin the fold and tumble operation of the seat assembly of FIG. 9 using, for example, one or more switches (not shown) to activate the electric motor 81. As discussed above, upon activation, the electric motor 81 may pull on the inner cable of the cable assembly 82, for example, to move the fold and tumble release lever 48. In one embodiment, one switch may be used to move the fold and tumble release lever 48 to unlatch the recliner mechanism 34, and another switch may be used to move the fold and tumble release lever 48 further to unlatch the latches 26a,b. In another embodiment, a single switch may be used to effect an entire fold and tumble operation. The seat assembly 10 may then be manually returned to the use position in a similar manner as described above with respect to the embodiment of FIGS. 2-8.

The fold and tumble apparatus components can be made of any suitable material and in any suitable manner. For example, the brackets 36, 38 and 66, recliner device components, levers 42, 48 and 60, handles 74 and 75, and handle linkage 76 may be stamped from sheet steel or aluminum. As another example, components such as the cam 50 may be made of molded plastic, such as injection molded acetal or nylon, or molded composite material, such as glass filled nylon. As another example, the springs 54 and 73 may be made of a suitable metal, such as stainless steel or spring steel.

Figure 10:
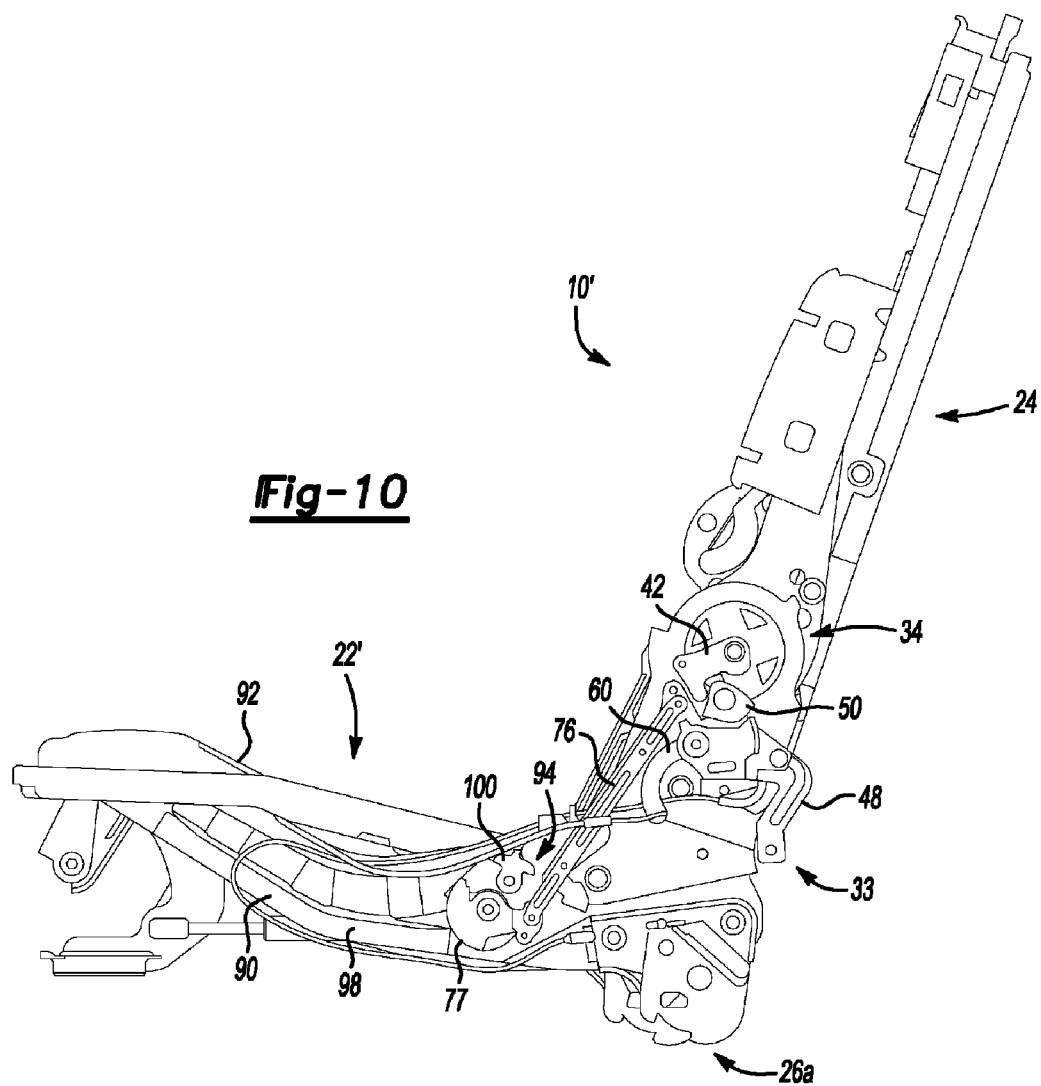
FIG. 10 is a side view of another embodiment of a seat assembly according to the present disclosure including an interlock device.
Figure 11:
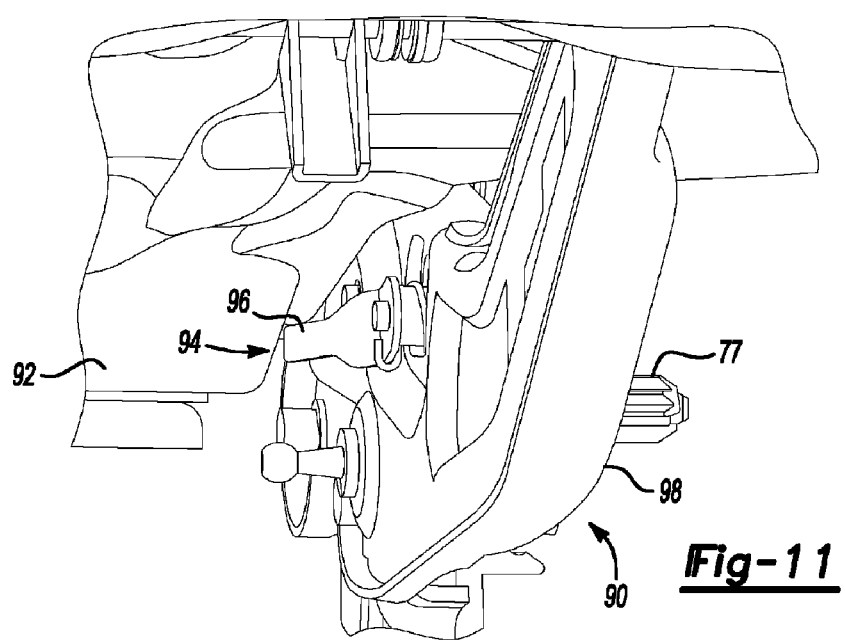
FIG. 11 is an enlarged perspective view of a portion of the seat assembly of FIG. 10 showing a first rotatable member of the interlock device engaged with a seat pan of the seat assembly.
Figure 12:
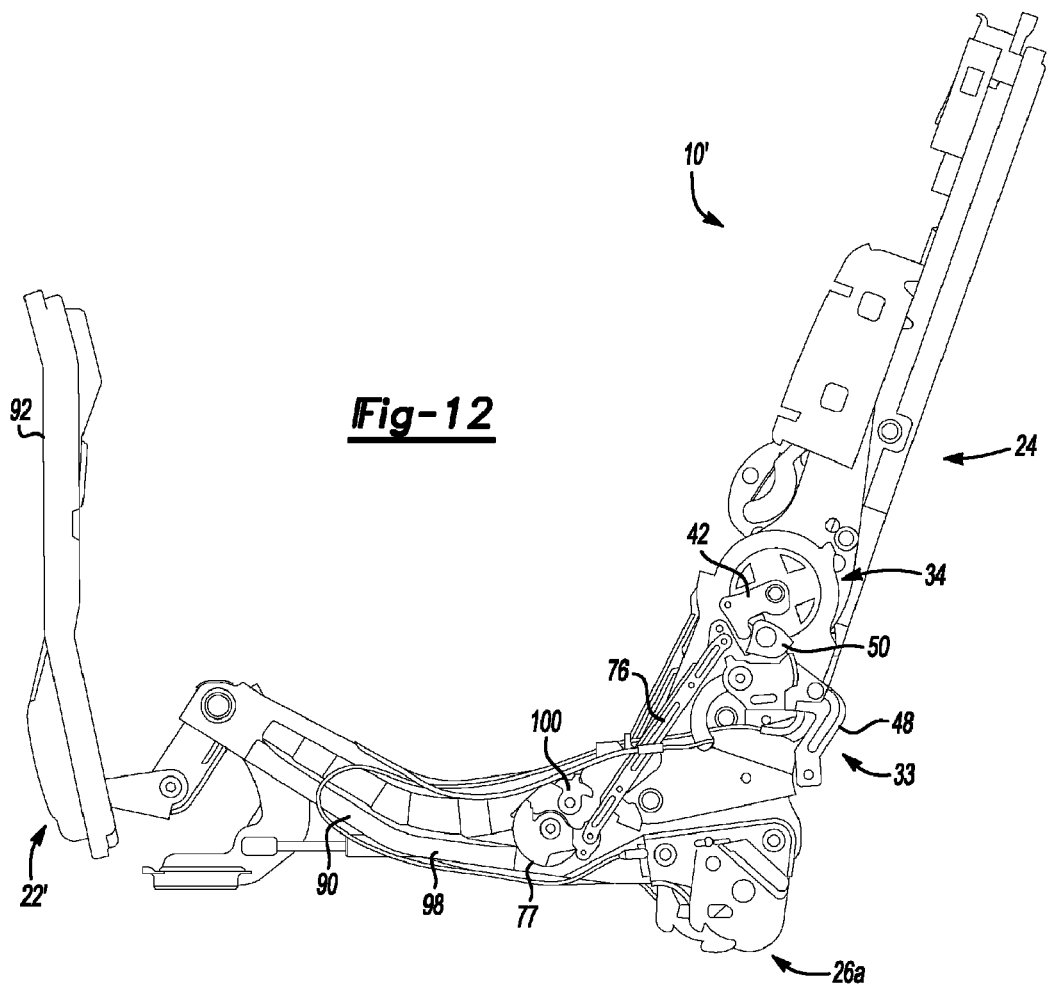
FIG. 12 is a side view of the seat assembly of FIG. 10 showing the seat pan in a raised position.

Referring to FIGS. 10-15, another embodiment 10' of a seat assembly according to the present disclosure is shown. The seat assembly 10' includes similar components as the seat assembly 10, and operates in a similar manner. In addition, the seat assembly 10' is provided with a interlock feature that inhibits or prevents latches 26a,b from being released when at least a portion of seat bottom 22' is flipped up. Referring to FIGS. 10 and 12, for example, the seat bottom 22' may include a main frame, such as an outer or lower frame 90, and an inner or upper seat support portion, such as a seat pan 92, that is pivotally attached to the frame 90 such that the seat pan 92 is movable between a generally horizontal use position, shown in FIG. 10, and a generally upright raised position, shown in FIG. 12. Furthermore, the seat assembly 10' may include an interlock device 94 associated with fold and tumble release lever 48 and configured to inhibit movement of the fold and tumble release lever 48 and latch release lever 60 when the seat pan 92 is in the raised position.

Referring to FIGS. 10-14, the interlock device 94 may include a first member or lever 96 disposed inboard of a side member 98 of the frame 90, and a second member or lever 100 disposed outboard of the side member 98 and connected to the first lever 96. More specifically, referring to FIG. 13, the first and second levers 96 and 100, respectively, may be mounted on a pivot pin or rod 102 that extends through an opening 104 formed in the side member 98, as well as through an opening 106 formed in side bracket 69'.

The opening 104 in the side member 98 may be large enough so that the first lever 96 may be inserted therethrough. With such a configuration, the interlock device 94 may be pre-assembled onto the side bracket 69', and then the side bracket 69' and the fold and tumble release apparatus 33 may be assembled onto the frame 90 and seat back 24.

Figure 13:
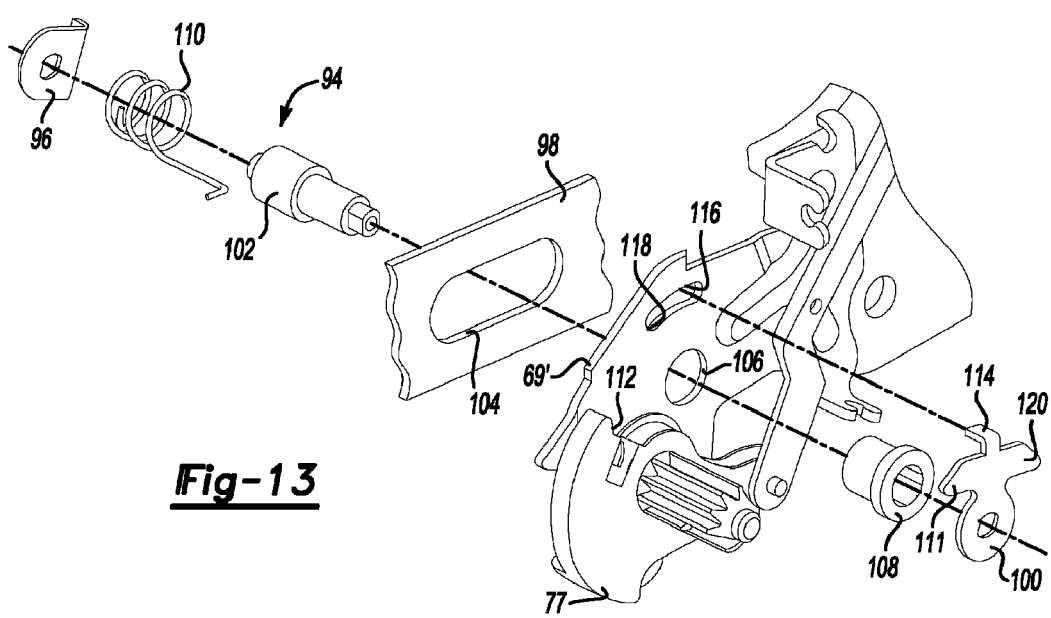
FIG. 13 is an exploded perspective view of the interlock device.
Figure 14:
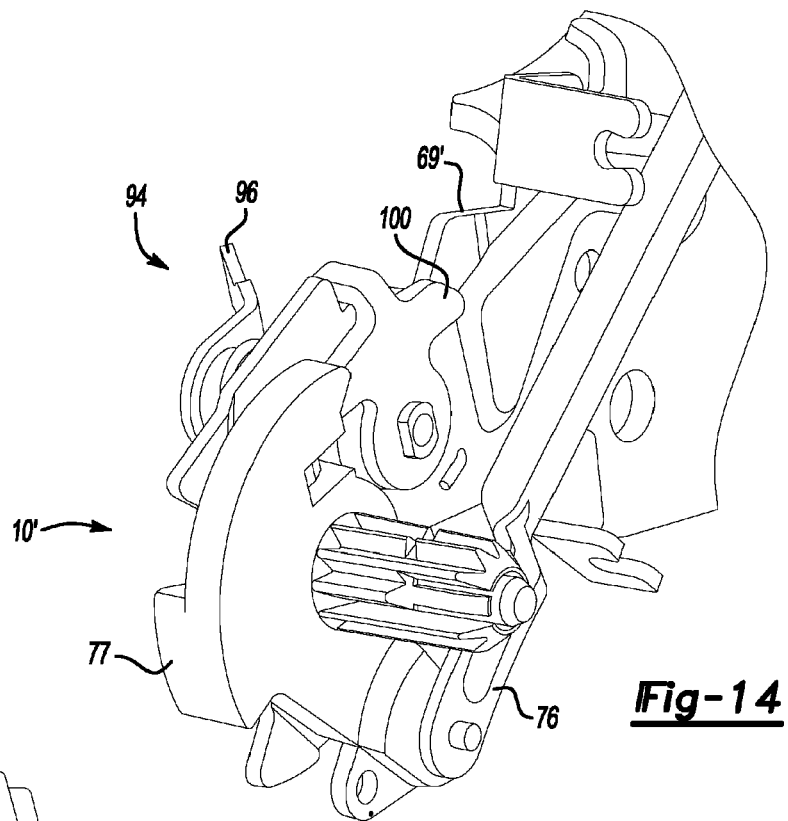
FIG. 14 is an enlarged perspective view of the interlock device showing the first member in a raised position.

Still referring to FIG. 13, the interlock device 94 may further include a bushing 108 positioned on the pivot rod 102 and received in the openings 104 and 106, and a spring member 110 that urges the first lever 96 upwardly. For example, the spring member 110 may be a torsion spring having one end connected to the first lever 96 and an opposite end connected to the side bracket 69' or side member 98.

Referring to FIG. 11, the first lever 96 is engageable with the seat pan 92 when the seat pan 92 is in the use position. As the seat pan 92 is moved toward the raised position shown in FIG. 12, the first lever 96 rotates upwardly, which causes the second lever 100 to rotate downwardly. When the seat pan 92 reaches the raised position, the seat pan 92 is disengaged from the first lever 96, and the second lever 100 is in a blocking position shown in FIG. 14.

In the blocking position, the second lever 100 blocks movement of the fold and tumble release lever 48 beyond a predetermined position. For example, the second lever 100 may include an engaging portion 111 that engages a shoulder 112 on spindle 77 when the fold and tumble release lever 48 has rotated through first angle $\alpha$, thereby preventing movement of the fold and tumble release lever 48 through second angle $\beta$. In that regard, as noted above, the fold and tumble release lever 48 may be connected to the spindle 77 with link 76, for example, such that movement of the fold and tumble release lever 48 may be linked with movement of the spindle 77. As a result, movement of the fold and tumble release lever 48 may be inhibited or prevented by blocking movement of the spindle 77.

Figure 15:
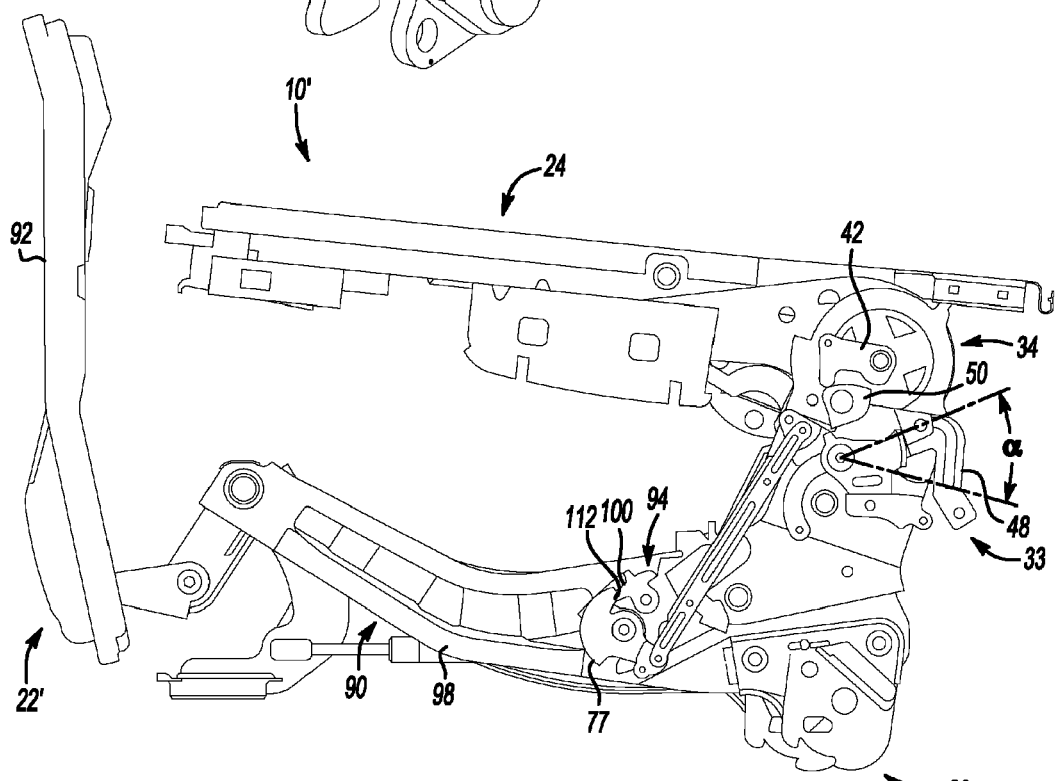
FIG. 15 is a side view of the seat assembly of FIG. 10 showing a seat back of the seat assembly in a folded or lowered position.

With the above configuration, when the seat pan 92 is in the raised position, the fold and tumble release lever 48 may only rotate a sufficient amount to release recliner mechanism 34, but not release the floor latches 26a,b. The seat back 24 may then rotate forwardly, as explained above, to provide a load surface or floor as shown in FIG. 15.

If the seat pan 92 remains in the use position, however, then the seat assembly 10' may function as described above with respect to the seat assembly 10. In that regard, the fold and tumble release lever 48 may be used to release the recliner mechanism 34 and unlatch the latches 26a,b as described above in detail.

Referring to FIG. 13, the interlock device 94 may also include a travel limiter for limiting movement of the second lever 100. For example, the second lever 100 may include a tab 114 that is received in a groove or slot 116 formed in the side bracket 69'. When the seat pan 92 is moved to the raised position, the second lever 100 may rotate forwardly or downwardly until the tab 114 engages an end stop, such as end wall 118 formed in the side bracket 69'.

The second lever 100 may also include an additional engaging portion 120 that extends in a generally opposite direction as the engaging portion 111. With such a configuration, the second lever 100 may be used on either side of the seat assembly 10'. That is, if a fold and tumble apparatus were provided on a side of the seat assembly 10' opposite the side shown in FIG. 13, the second lever 100 could still be used in that arrangement to inhibit movement of the fold and tumble apparatus. In such case, the additional engaging portion 120 may be used to engage a corresponding spindle to inhibit movement of a corresponding fold and tumble release lever.

As another example, the second lever 100 may be provided without a travel limiter or additional engaging portion. For example, the second lever 100 may have a generally linear configuration that includes a single engaging portion.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, a seat assembly according to the present disclosure may include a single latch that is unlatched directly by a fold and tumble release lever, or through a latch release lever that is moved by the fold and tumble release lever. Additionally, the features of various embodiments may be combined to form further embodiments of the invention.

What is claimed:

1. A fold and tumble mechanism for a vehicle seat including a seat bottom, a seat back that is pivotable with respect to the seat bottom, and a latch associated with the seat bottom for coupling the seat to a vehicle body, the fold and tumble mechanism comprising:

a seat back recliner mechanism adapted to pivotally mount the seat back to the seat bottom, the seat back recliner mechanism including a first bracket adapted to be connected to the seat bottom, and a second bracket adapted to be connected to the seat back;

a recliner release lever associated with the seat back recliner mechanism and being movable to selectively release the seat back recliner mechanism to allow the seat back to pivot;

a fold and tumble release lever including a cam that is engageable with the recliner release lever, the fold and tumble release lever being operable to move the recliner release lever to release the recliner mechanism, and further being operable to unlatch the latch; and a latch release lever that is movable with the fold and tumble release lever and configured to be associated with the latch for releasing the latch, wherein the latch release lever is engageable with one of the brackets of the recliner mechanism to inhibit movement of the fold and tumble release lever when the second bracket is in a use position relative to the first bracket.

2. The fold and tumble mechanism of claim 1 wherein the cam includes a dwell surface that is engageable with the recliner release lever to allow further movement of the fold and tumble release lever after the recliner mechanism has been released.

3. The fold and tumble mechanism of claim 2 wherein the fold and tumble release lever is pivotable through a first angle to move the recliner release lever and release the recliner mechanism, and then through a second angle to unlatch the latch while the recliner release lever engages the dwell surface of the cam.

4. The fold and tumble mechanism of claim 1 wherein the fold and tumble release lever is movable between first and second positions, and the cam includes a dwell surface that is engageable with the recliner release lever, and wherein when the fold and tumble release lever is moved from the first position to an intermediate position between the first and second positions, the cam engages the recliner release lever and causes the recliner release lever to move to a release position to release the recliner mechanism, and when the fold and tumble release lever is moved away from the intermediate position toward the second position, the latch release lever moves with the fold and tumble release lever to release the latch and the dwell surface of the cam slidingly engages the recliner release lever.

5. The fold and tumble mechanism of claim 1 wherein the recliner mechanism comprises a disk recliner mechanism.

6. A vehicle seat assembly for use with a vehicle having a vehicle body, the seat assembly comprising:
 a seat bottom including a seat portion that is movable between a use position and a raised position;
 a seat back;
 a recliner mechanism that pivotally couples the seat back to the seat bottom;
 a recliner release lever associated with the recliner mechanism for selectively releasing the recliner mechanism to allow pivotal movement of the seat back;
 a releasable latch associated with the seat bottom and being engageable with the vehicle body for inhibiting movement of the seat bottom with respect to the vehicle body;
 a fold and tumble release lever including a cam that is engageable with the recliner release lever, wherein the fold and tumble release lever is configured to move the recliner release lever to release the recliner mechanism and is further configured to release the latch; and
 an interlock device associated with the fold and tumble release lever, the interlock device being configured to inhibit movement of the fold and tumble release lever when the seat portion of the seat bottom is in the raised position.

7. The seat assembly of claim 6 further comprising a latch release lever associated with the latch for releasing the latch, the fold and tumble release lever being configured to move the latch release lever to release the latch.

8. The seat assembly of claim 7 wherein the recliner mechanism includes a first bracket connected to the seat bottom, and a second bracket connected to the seat back, and wherein the latch release lever is engageable with one of the brackets to inhibit movement of the fold and tumble release lever when the seat back is in a use position relative to the seat bottom.

9. The seat assembly of claim 7 wherein the fold and tumble release lever is movable between first and second positions, and the cam includes a dwell surface that is engageable with the recliner release lever, and wherein when the fold and tumble release lever is moved from the first position to an intermediate position between the first and second positions, the cam engages the recliner release lever and causes the recliner release lever to move to a release position to release the recliner mechanism, and when the fold and tumble release lever is moved away from the intermediate position toward the second position, the latch release lever moves with the fold and tumble release lever to release the latch and the dwell surface of the cam slidingly engages the recliner release lever.

10. The seat assembly of claim 8 wherein the latch release lever includes a tab that extends through an opening in the first bracket and engages the second bracket when the seat back is in a use position relative to the seat bottom to thereby inhibit movement of the fold and tumble release lever when the seat back is in the use position.

11. The seat assembly of claim 10 wherein the second bracket includes a notch that receives the tab when the seat back is in a folded position and the latch is released, such that movement of the seat back toward the use position is inhibited.

12. The seat assembly of claim 6 further comprising an electric motor configured to move the fold and tumble release lever to release the recliner mechanism and to release the latch.

13. The seat assembly of claim 6 wherein the cam includes a dwell surface that is engageable with the recliner release lever to allow further movement of the fold and tumble release lever after the recliner mechanism has been released.

14. The seat assembly of claim 13 wherein the fold and tumble release lever is pivotable through a first angle to move the recliner release lever and release the recliner mechanism, and then through a second angle to release the latch while the recliner release lever engages the dwell surface of the cam.

15. The seat assembly of claim 6 wherein the seat bottom includes a frame having a side member, and the seat portion is pivotally attached to the frame, and wherein the interlock device includes a first lever disposed inboard of the side member and engageable with the seat portion when the seat portion is in the use position, and a second lever disposed outboard of the side member and connected to the first lever, the second lever being movable to a blocking position for inhibiting movement of the fold and tumble release lever when the seat portion is moved to the raised position and is disengaged from the first lever.

16. A fold and tumble vehicle seat assembly for use with a vehicle, the seat assembly comprising:
 a seat bottom;

a seat back;

a recliner mechanism that pivotally couples the seat back to the seat bottom such that the seat back is pivotable between a use position and a folded position, the recliner mechanism including a lower bracket attached to the seat bottom and an upper bracket attached to the seat back;

a recliner release lever associated with the recliner mechanism and being movable to a release position for selectively releasing the recliner mechanism to allow the seat back to pivot;

a fold and tumble release lever that is rotatable through first and second angles, the fold and tumble release lever including a cam that is engageable with the recliner release lever to move the recliner release lever to the release position, the cam including a dwell surface that is engageable with the recliner release lever when the recliner release lever is in the release position;

at least one floor latch mounted to the seat bottom for selectively coupling the seat bottom to the vehicle; and a floor latch release lever that is rotatable with the fold and tumble release lever and operable to unlatch the at least one floor latch, the floor latch release lever having a tab that extends through the lower bracket of the recliner mechanism and is engageable with the upper bracket to prevent the fold and tumble release lever from rotating through the second angle when the seat back is not in the folded position;

wherein when the fold and tumble release lever is rotated through the first angle, the cam causes the recliner release lever to move to the release position to allow the seat back to pivot from the use position toward the folded position, and when the fold and tumble release lever is rotated through the second angle, the recliner release lever contacts the dwell surface and the floor latch release lever rotates with the fold and tumble release lever to cause the at least one floor latch to unlatch.

17. The seat assembly of claim 16 further comprising an interlock device associated with the fold and tumble release lever, wherein the seat bottom comprises a seat pan that is movable between a use position and a raised position, and the interlock device is configured to inhibit movement of the fold and tumble release lever when the seat pan is in the raised position.

18. A vehicle seat assembly for use with a vehicle having a vehicle body, the seat assembly comprising:

a seat bottom;

a seat back;

a recliner mechanism that pivotally couples the seat back to the seat bottom;

a recliner release lever associated with the recliner mechanism for selectively releasing the recliner mechanism to allow pivotal movement of the seat back;

a releasable latch associated with the seat bottom and being engageable with the vehicle body for inhibiting movement of the seat bottom with respect to the vehicle body; and a fold and tumble release lever including a cam that is engageable with the recliner release lever, wherein the fold and tumble release lever is configured to move the recliner release lever to release the recliner mechanism and is further configured to release the latch, and wherein the cam includes a dwell surface that is engageable with the recliner release lever to allow movement of the fold and tumble release lever with respect to the recliner release lever, after the recliner mechanism has been released, in order to release the latch.

19. The seat assembly of claim 18 further comprising a latch release lever associated with the latch for releasing the latch, the fold and tumble release lever being engageable with the latch release lever to move the latch release lever and release the latch.

20. The seat assembly of claim 18 wherein the recliner mechanism includes a first bracket connected to the seat bottom, and a second bracket connected to the seat back, and wherein the fold and tumble release lever and the recliner release lever are both disposed on one side of the brackets.

\* \* \* \* \*